Figure 1:
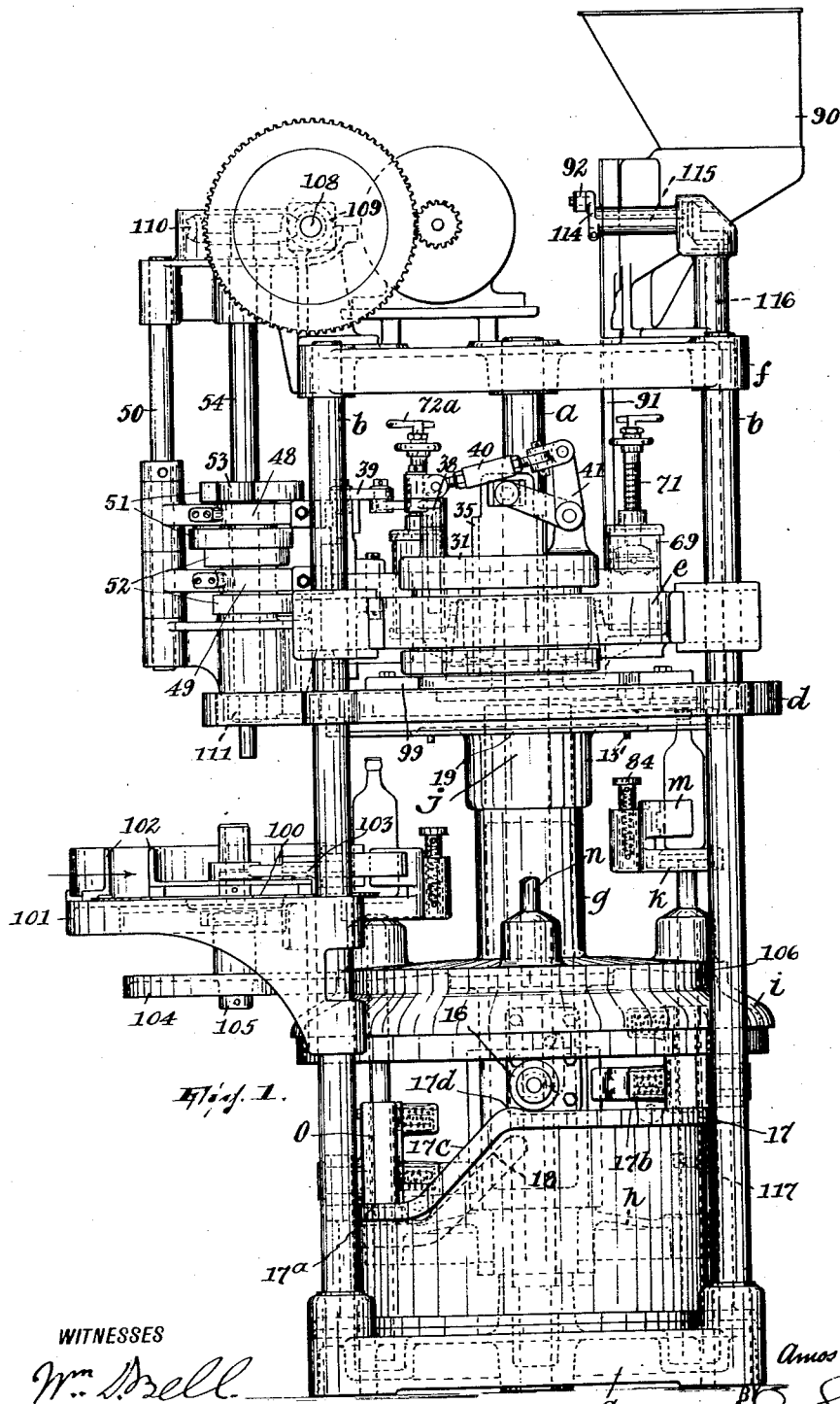

A. CALLESON.
FILLING AND CAPPING MACHINE.
APPLICATION FILED JUNE 23, 1913.

1,182,142.

Patented May 9, 1916.
15 SHEETS—SHEET 1.

WITNESSES
Wm D Bell
Elise Kaufmann

INVENTOR,
Amos Calleson,
John Steward,
ATTORNEY.

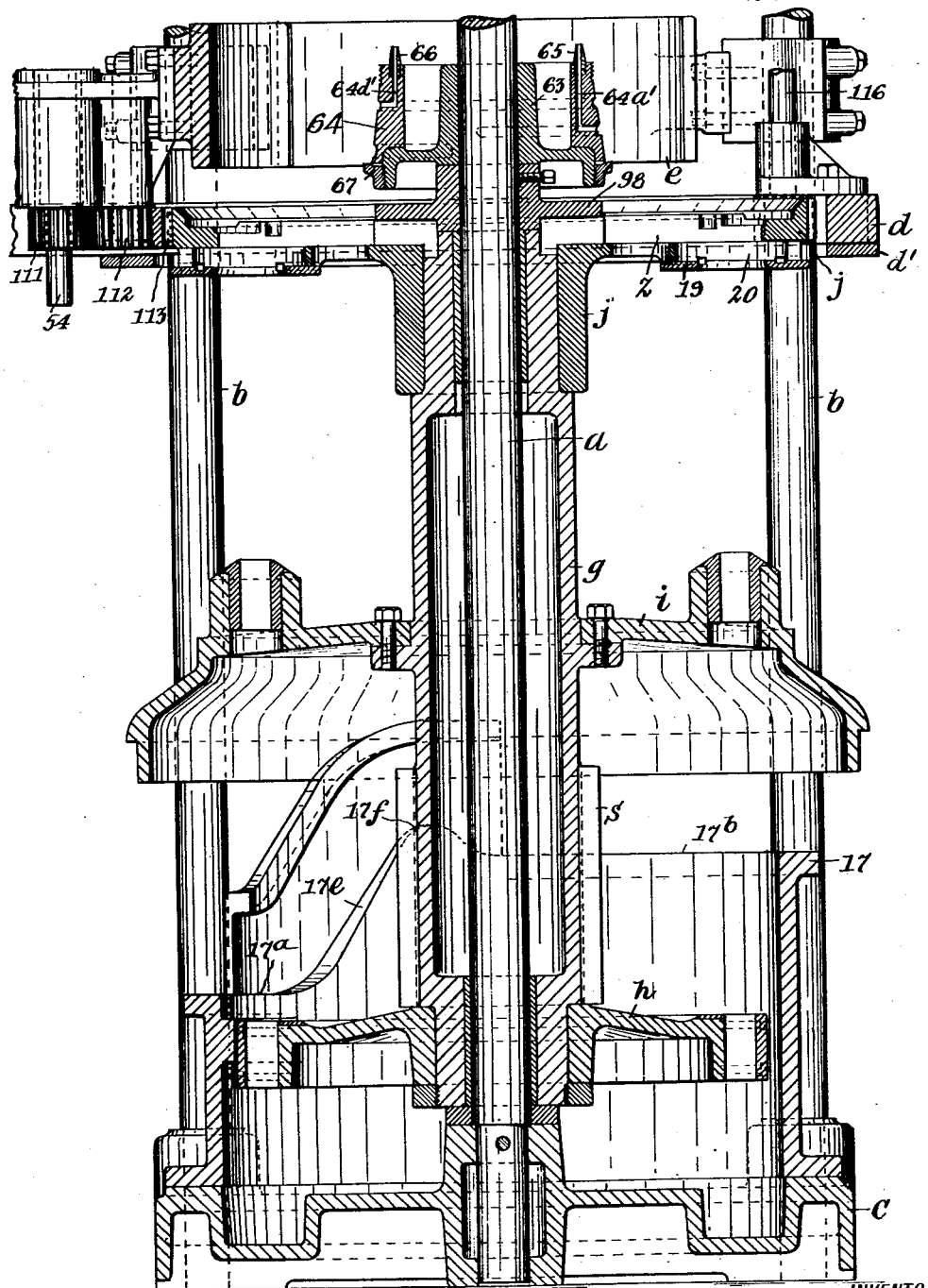

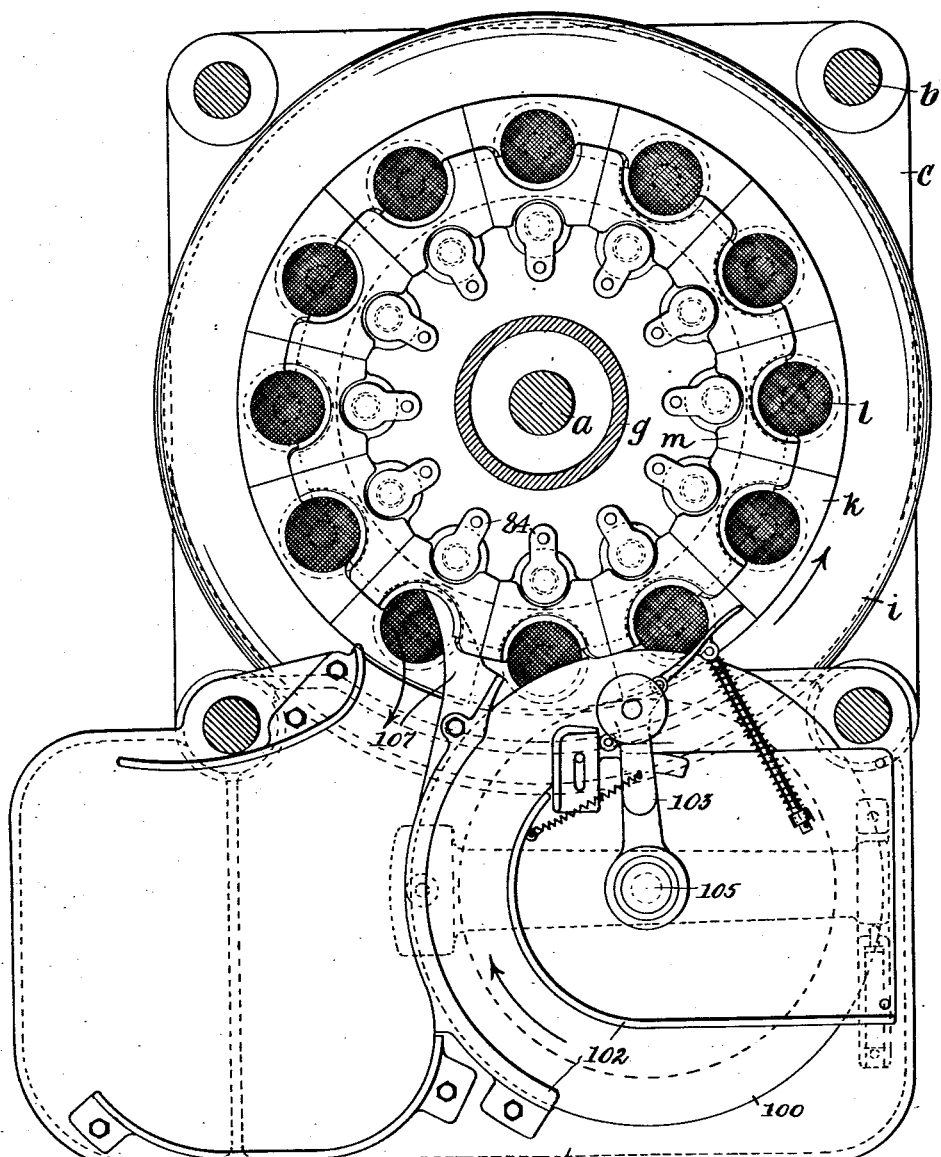

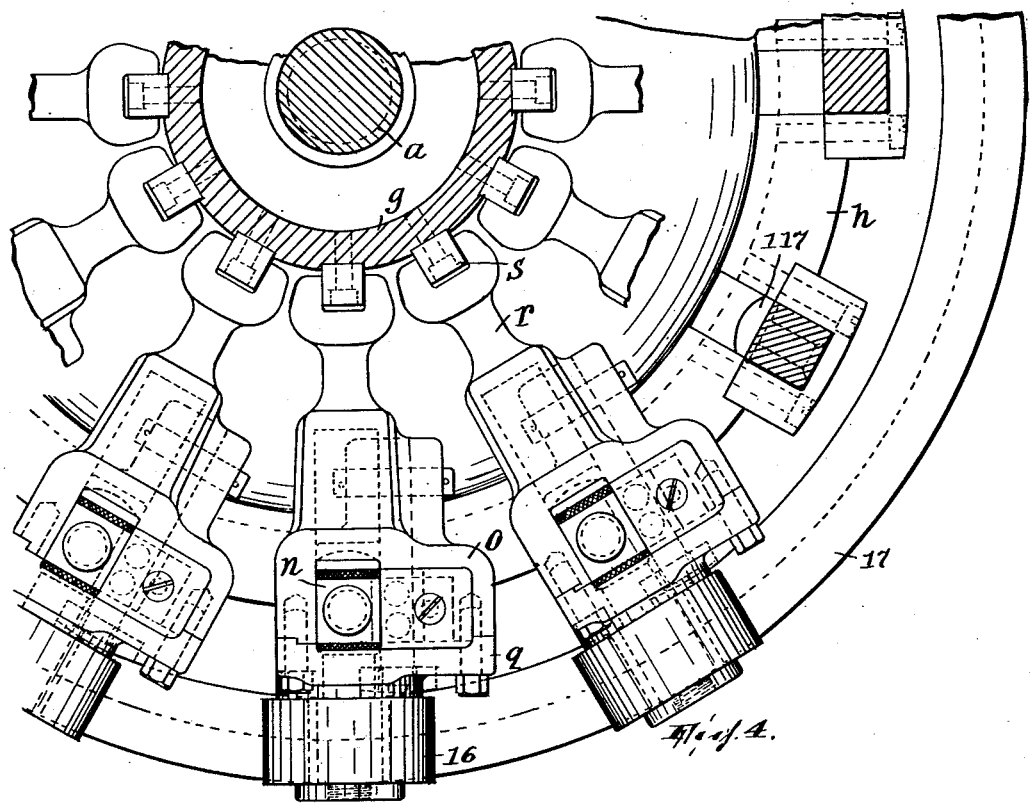
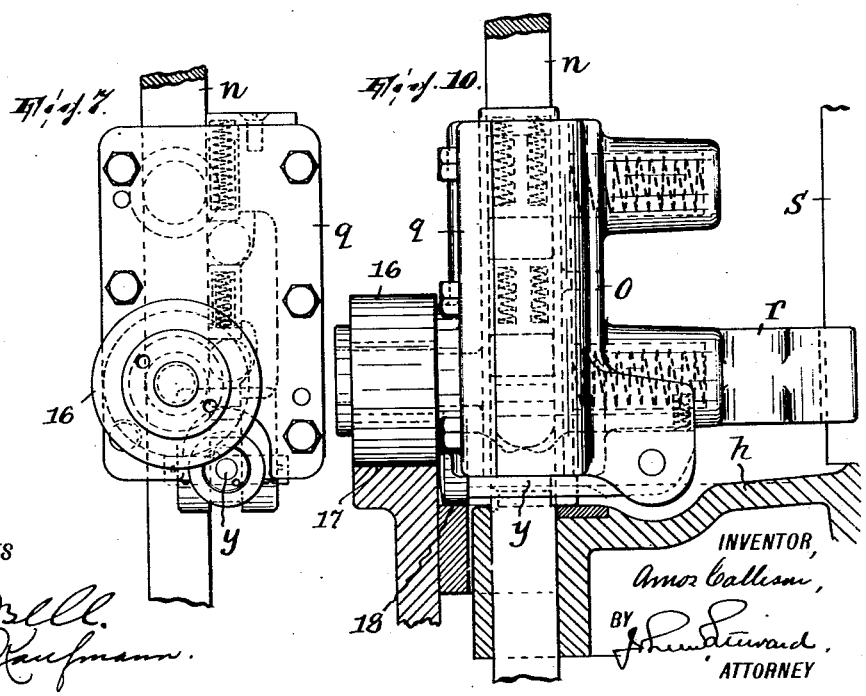

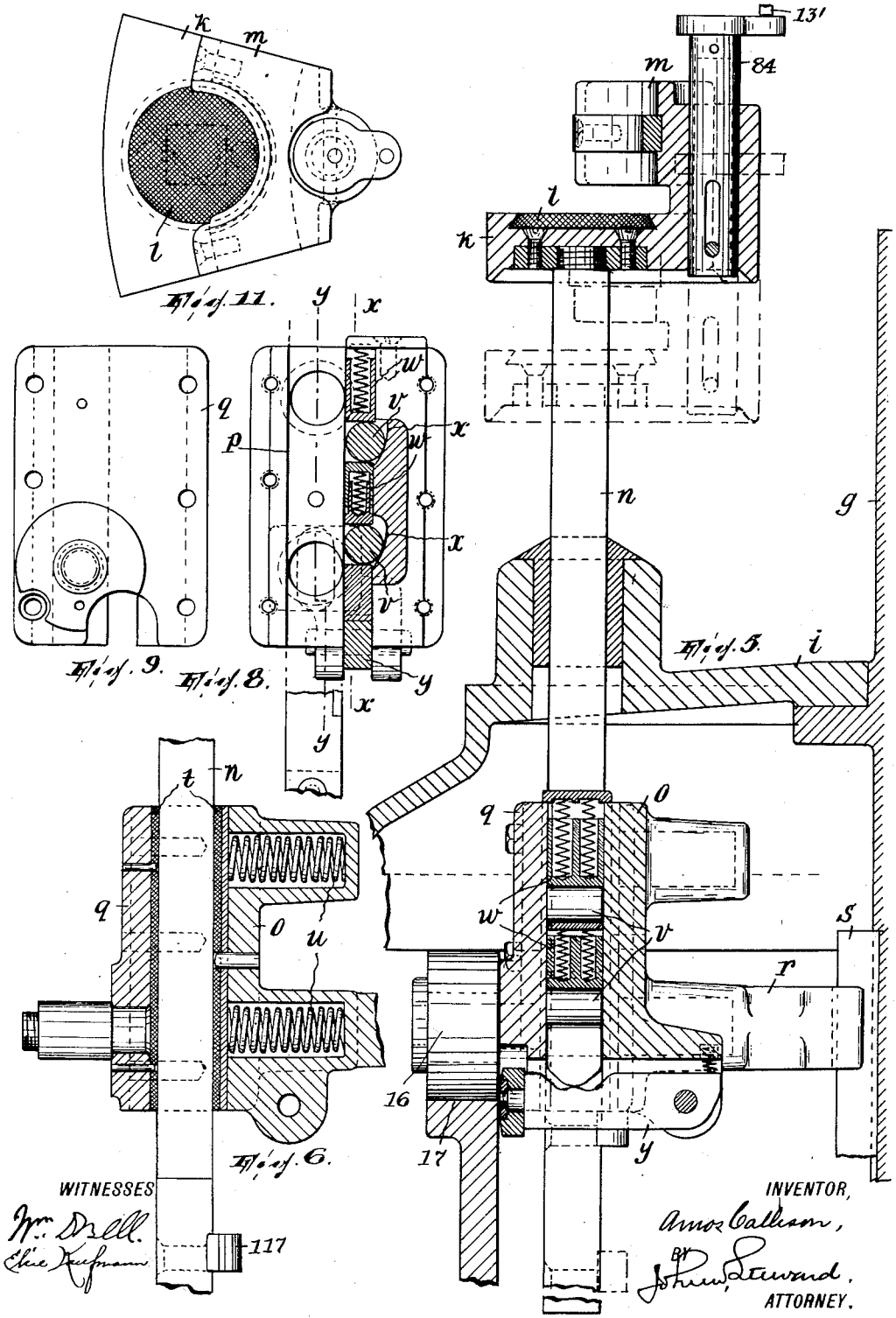

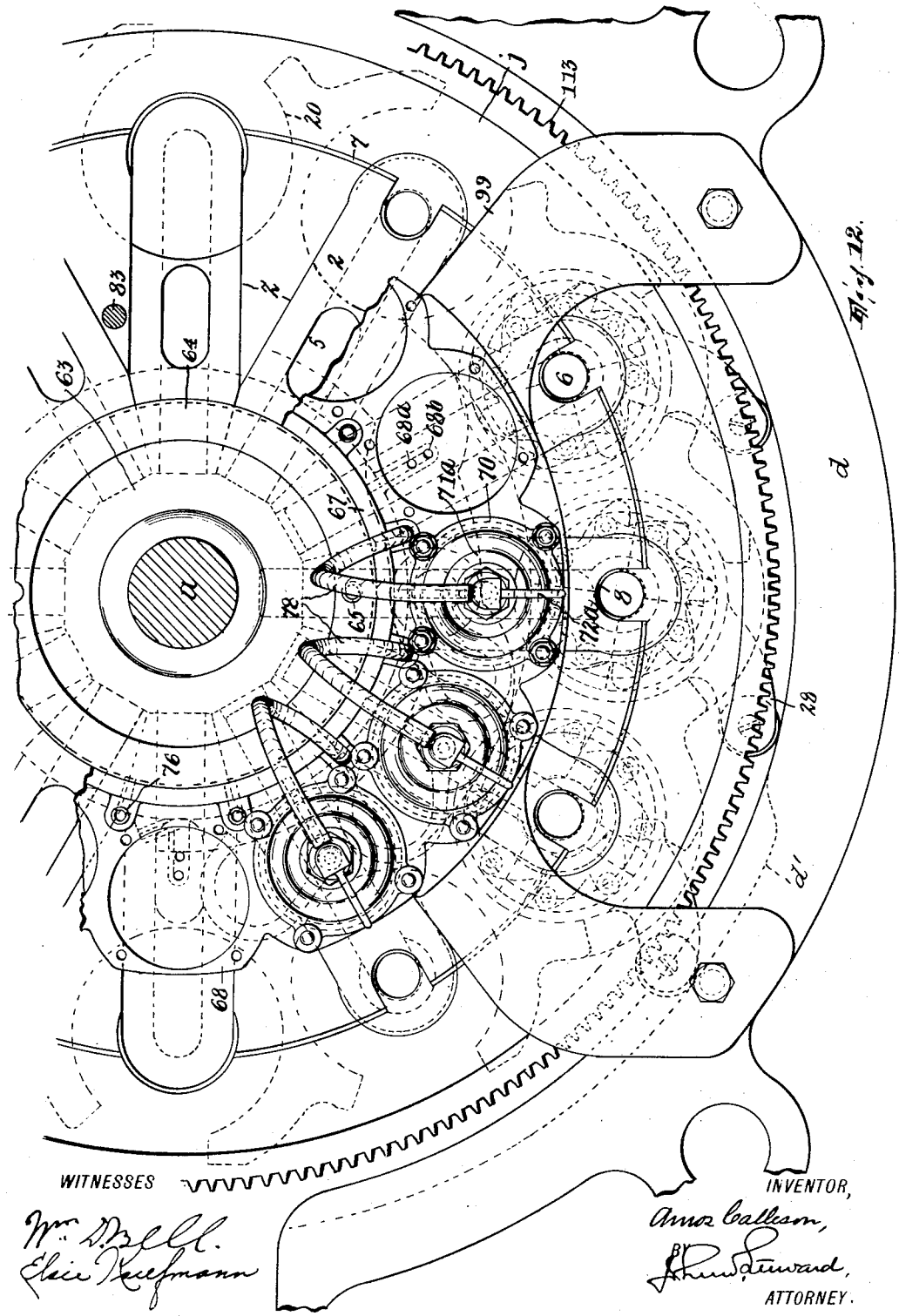

A. CALLESON.
FILLING AND CAPPING MACHINE.
APPLICATION FILED JUNE 23, 1913.
1,182,142.
Patented May 9, 1916.
15 SHEETS—SHEET 7.
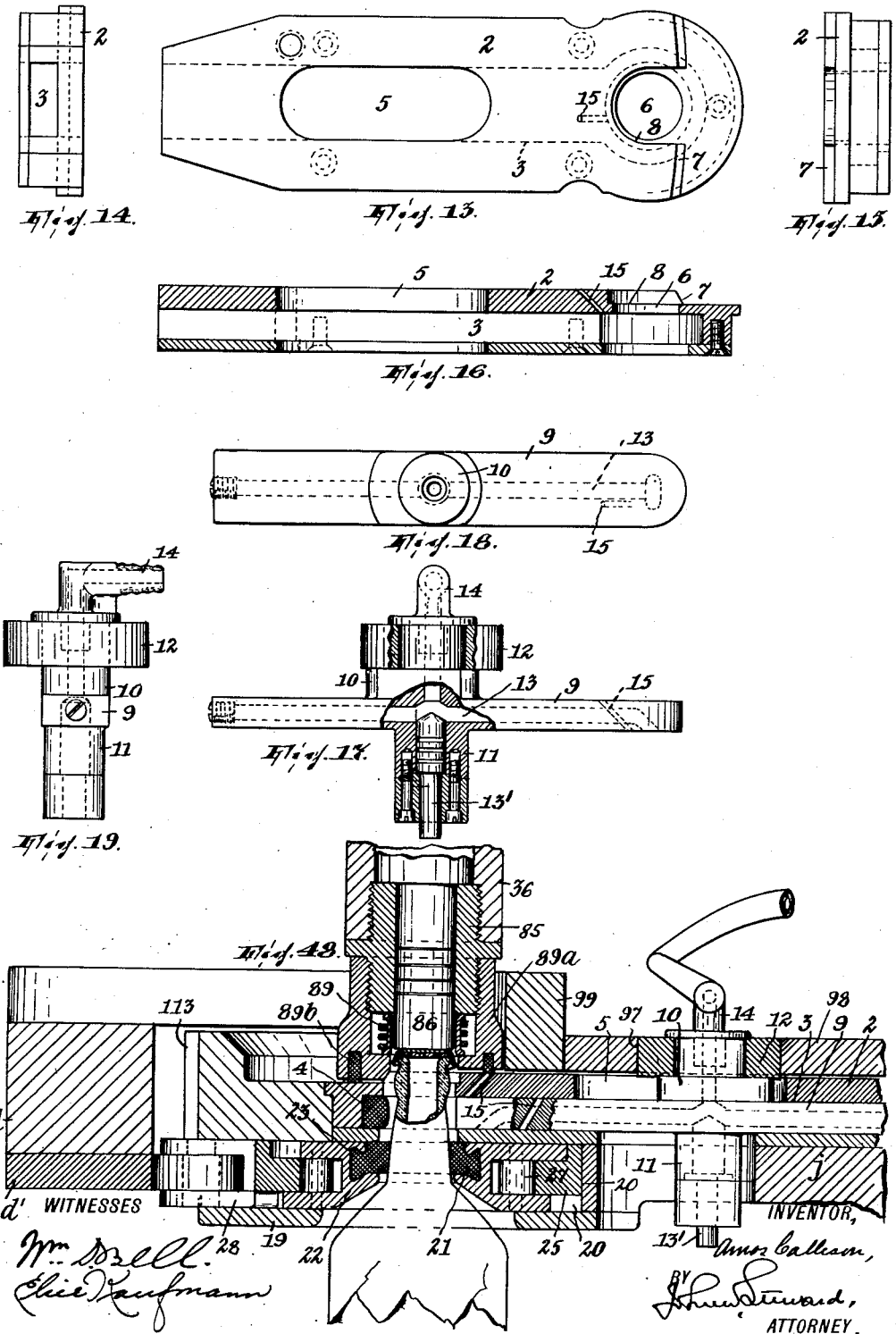

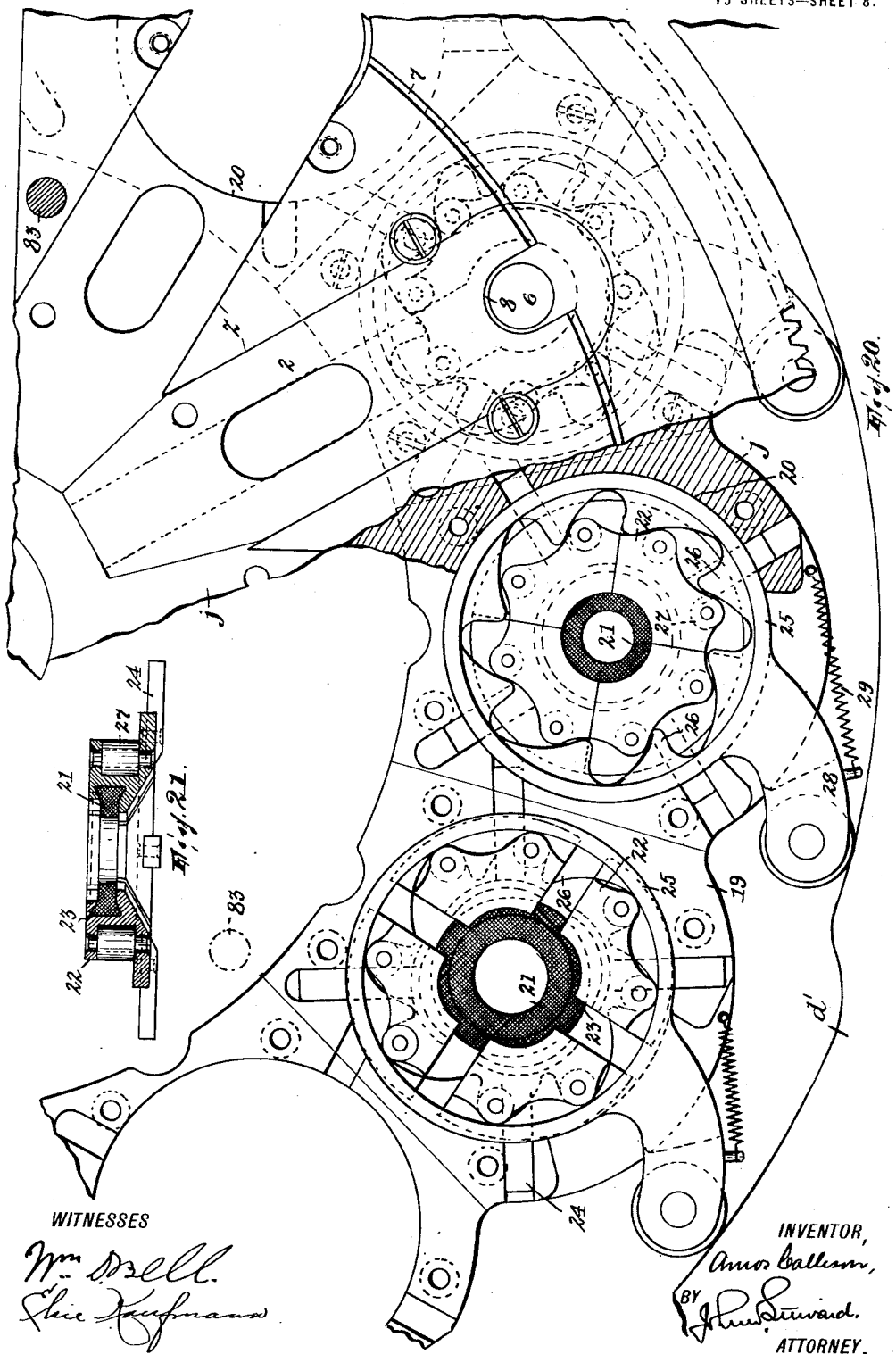

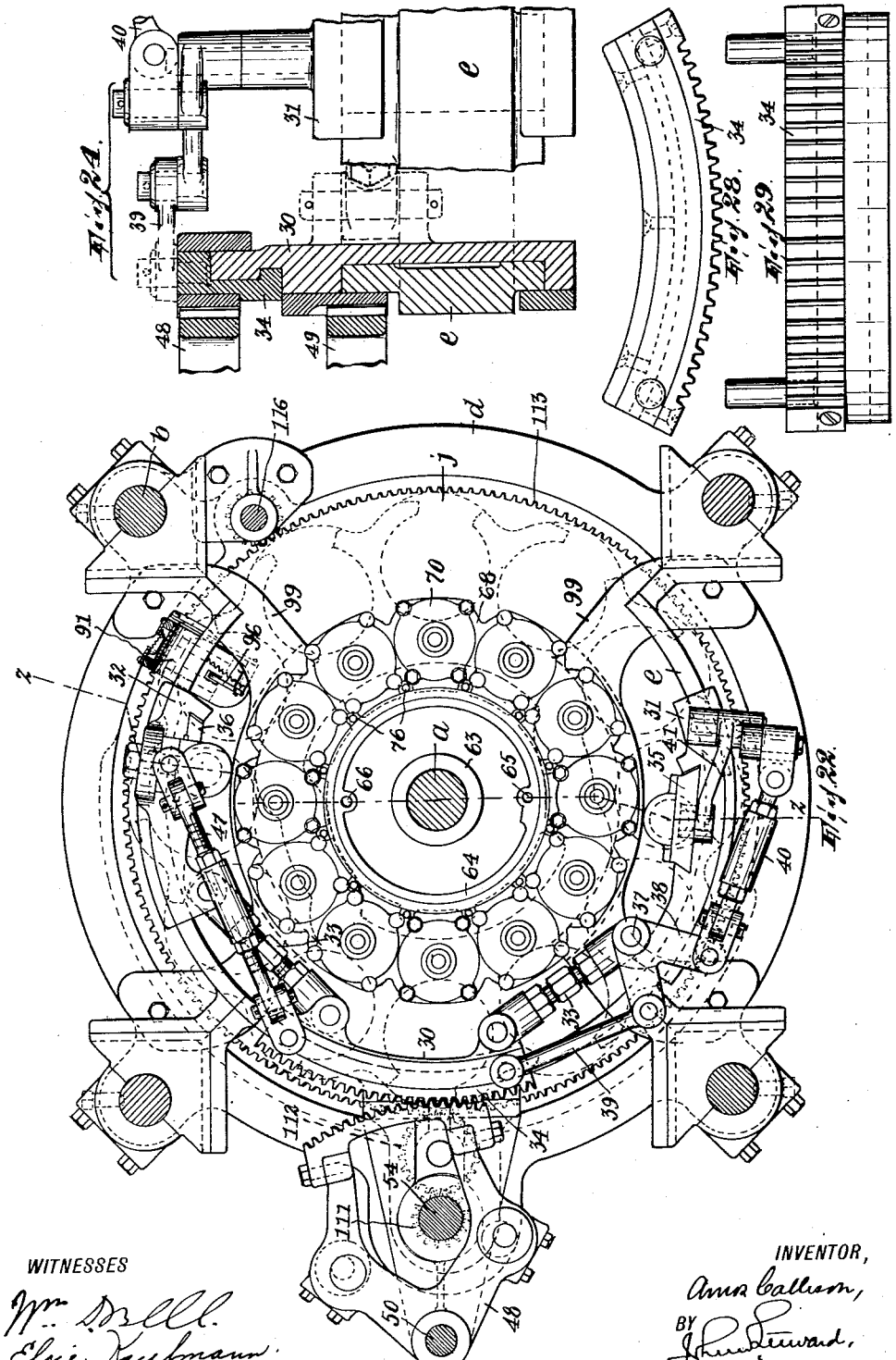

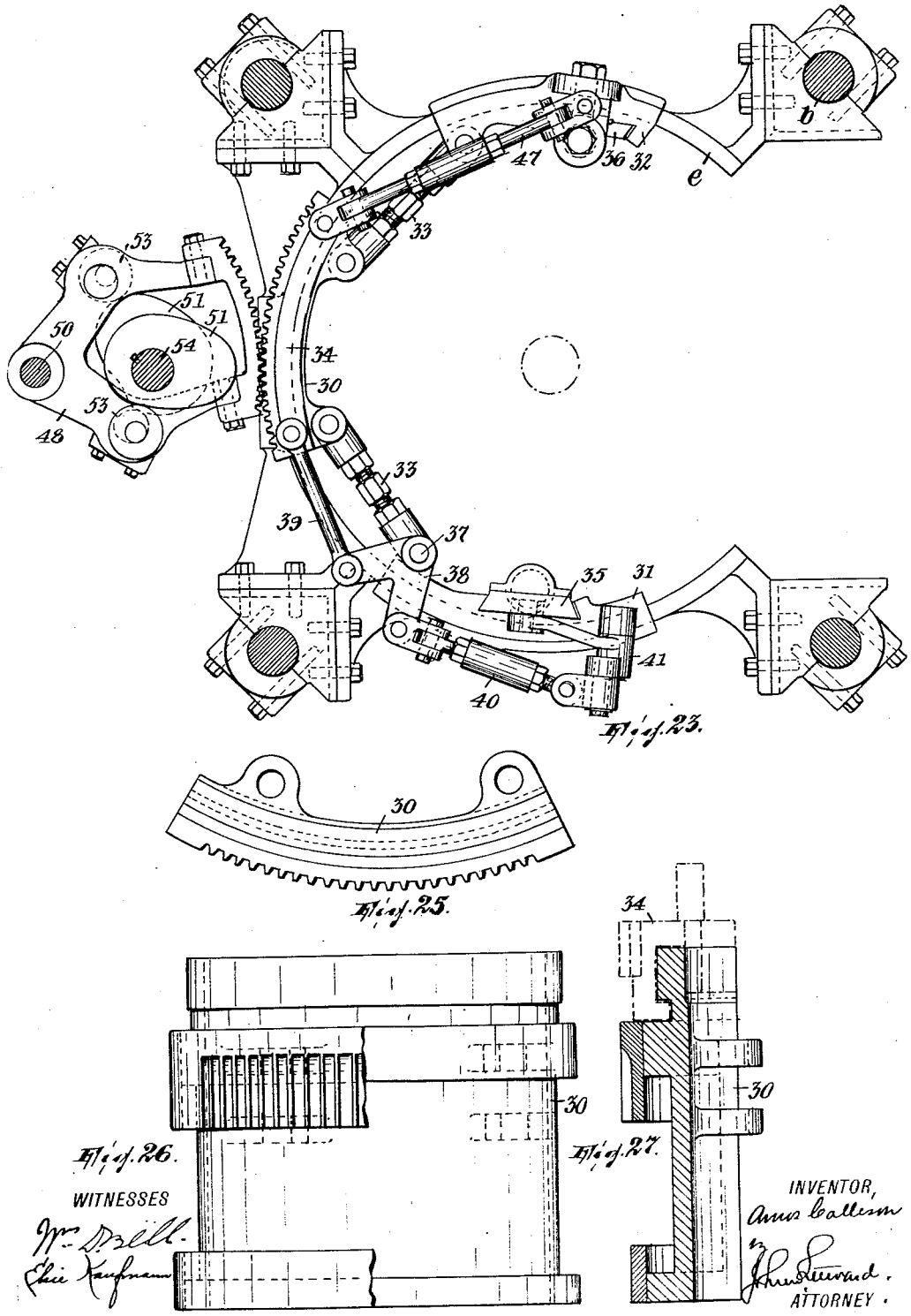

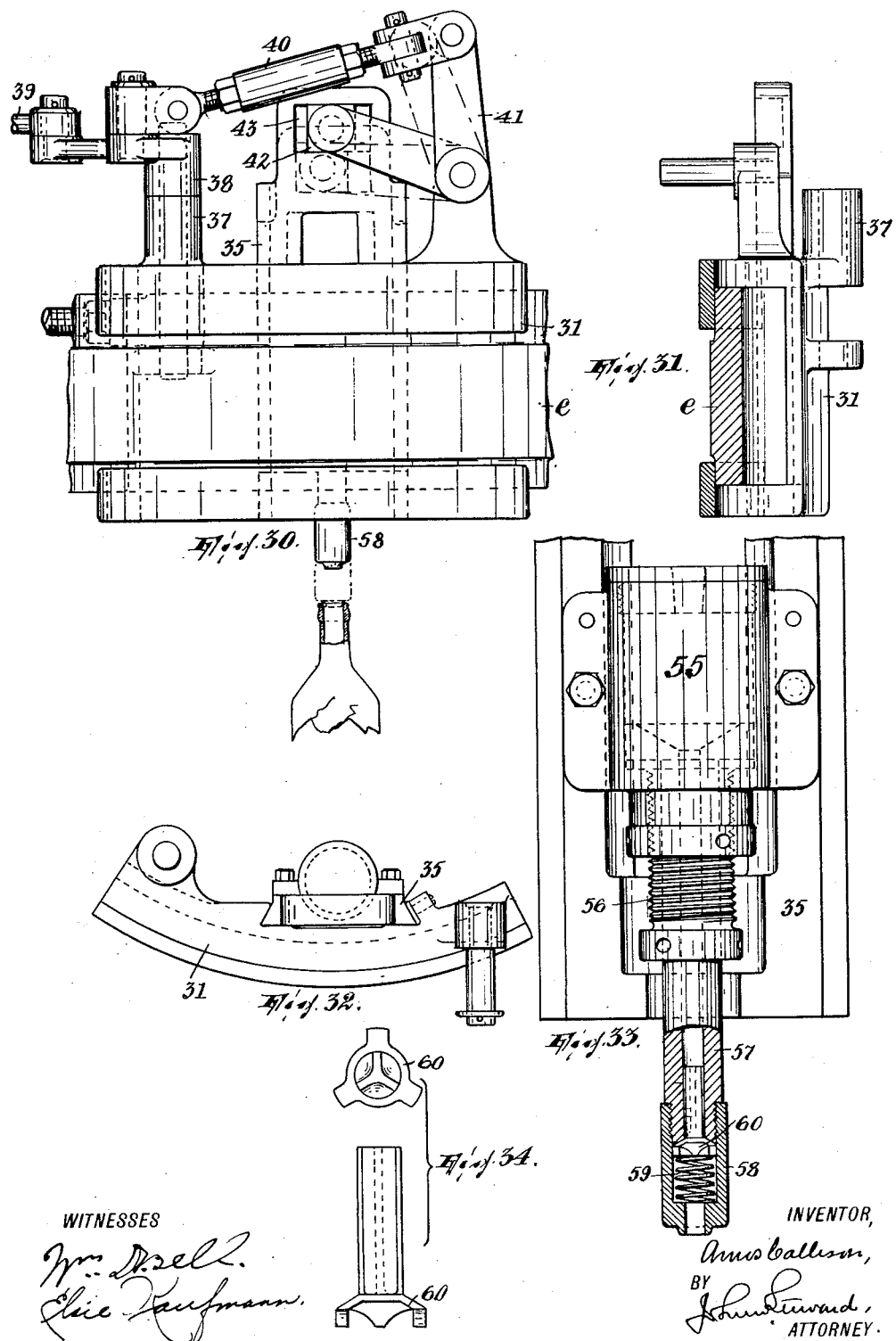

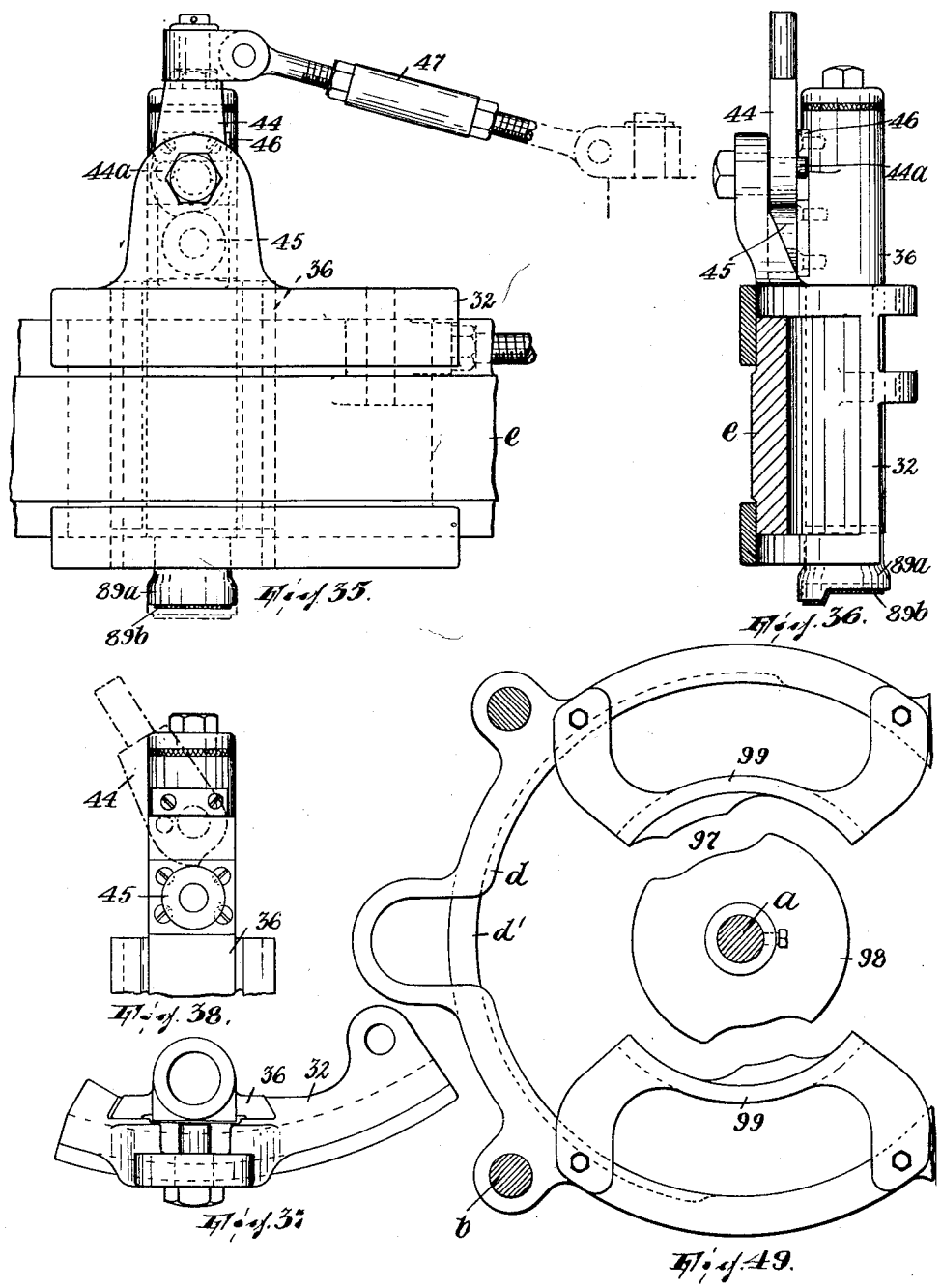

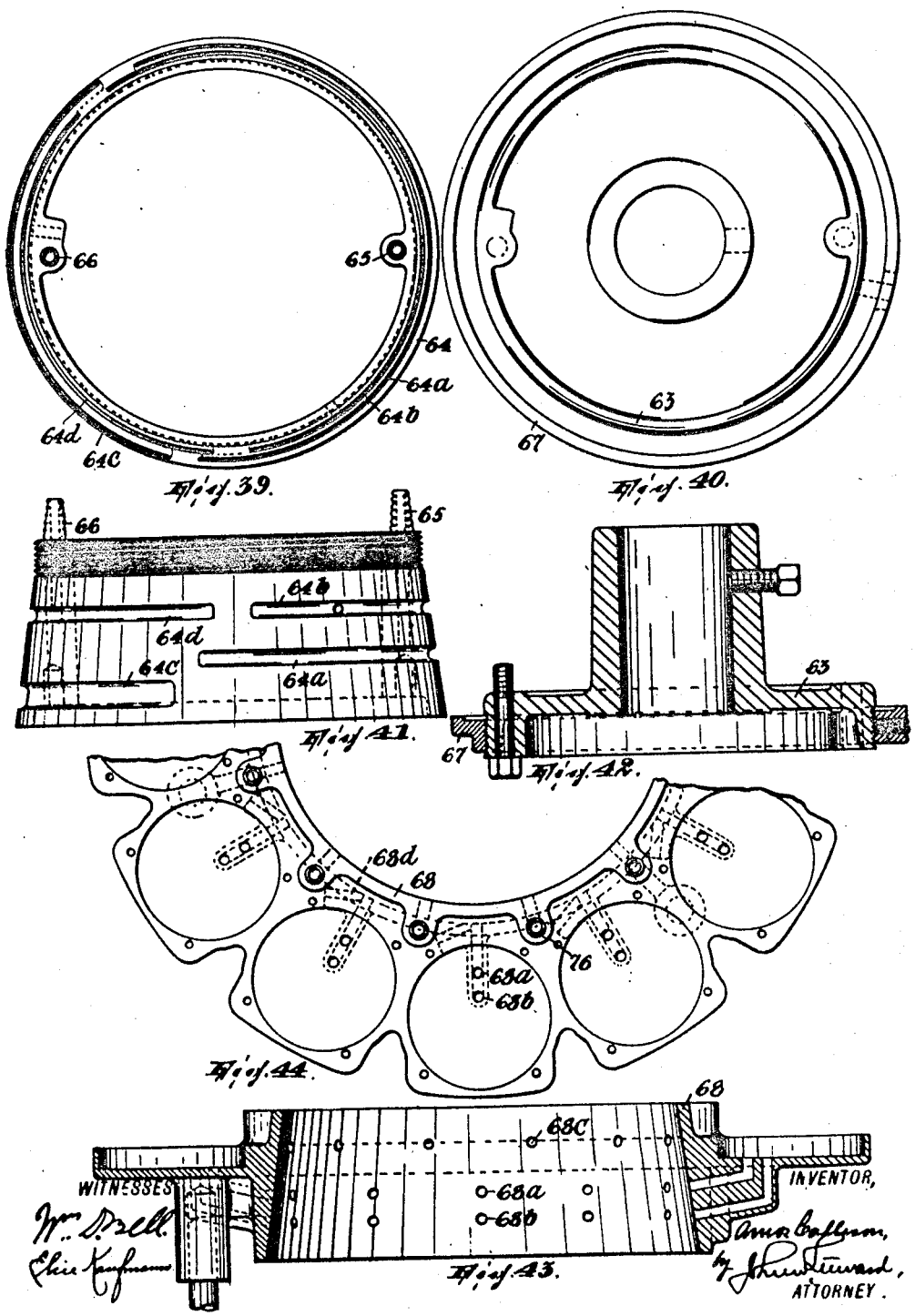

A. CALLESON.
FILLING AND CAPPING MACHINE.
APPLICATION FILED JUNE 23, 1913.
1,182,142.
Patented May 9, 1916.
15 SHEETS—SHEET 14.
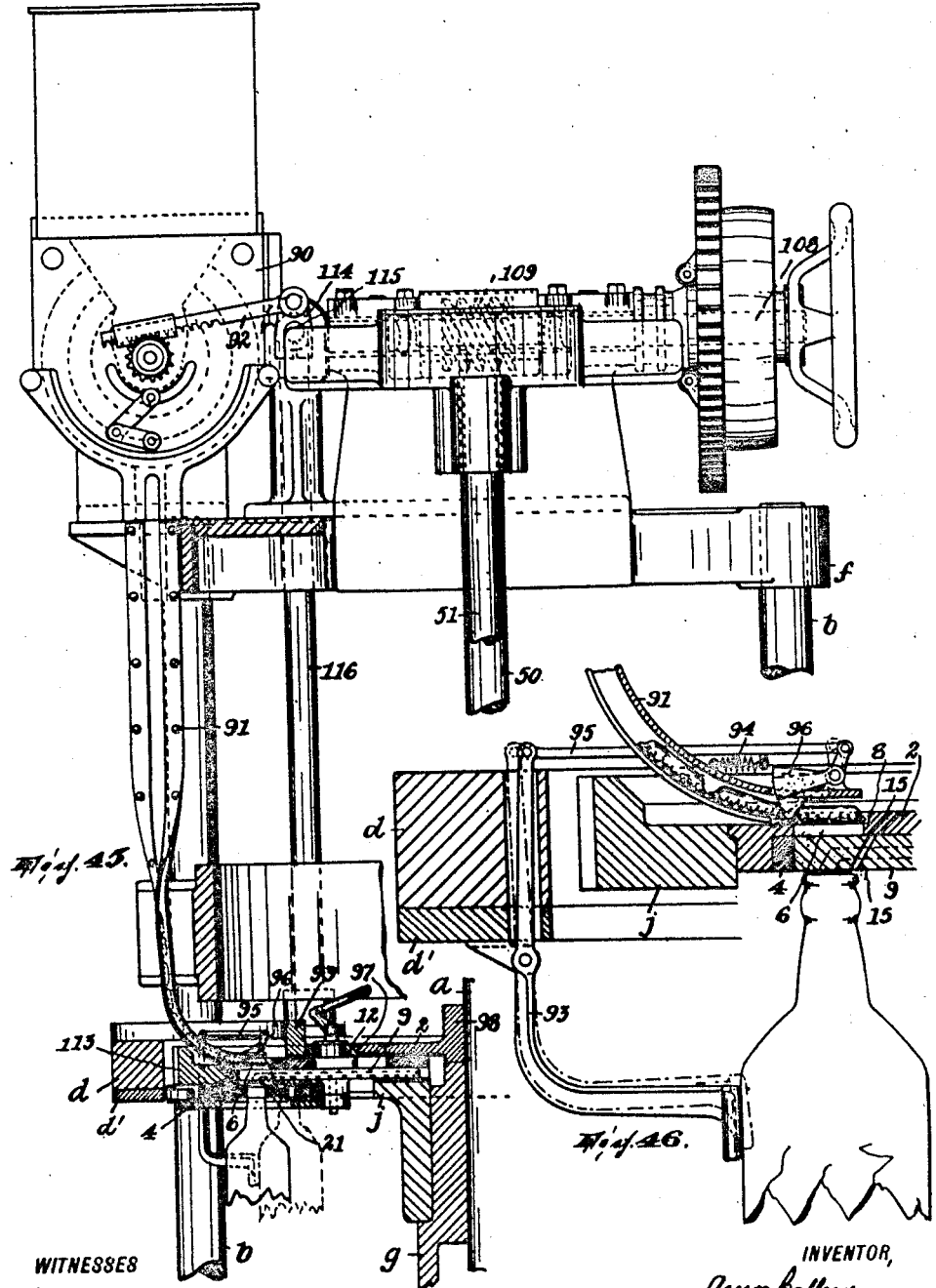
WITNESSES
INVENTOR,
Amos Calleson,
BY
ATTORNEY.

A. CALLESON.
FILLING AND CAPPING MACHINE.
APPLICATION FILED JUNE 23, 1913.
1,182,142.
Patented May 9, 1916.
15 SHEETS—SHEET 15.
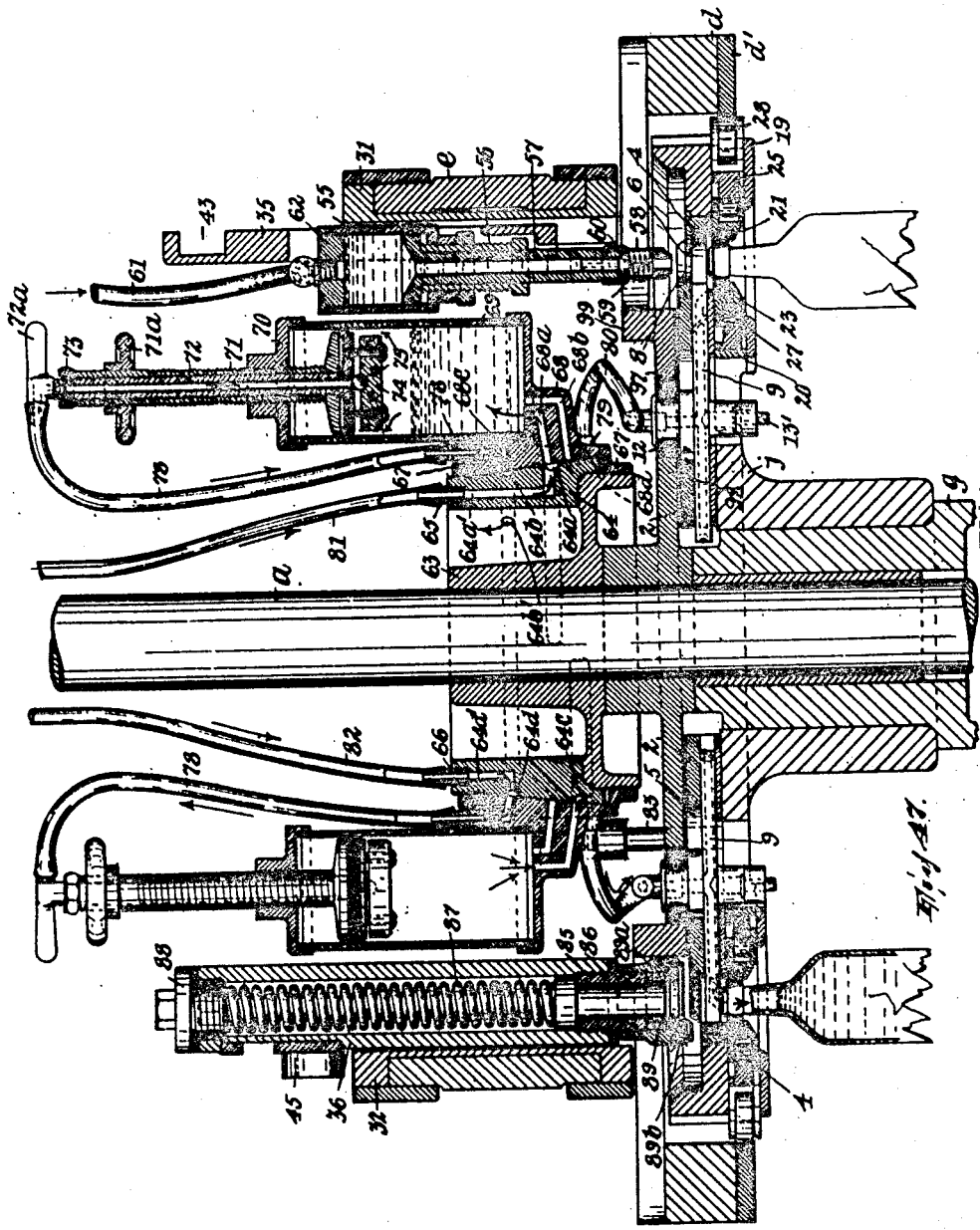
WITNESSES
INVENTOR,
ATTORNEY.

UNITED STATES PATENT OFFICE.

AMOS CALLESON, OF BROOKLYN, NEW YORK, ASSIGNOR TO BENJAMIN ADRIANCE, OF BROOKLYN, NEW YORK.

FILLING AND CAPPING MACHINE.

1,182,142.　　　　　Specification of Letters Patent.　　　Patented May 9, 1916.

Application filed June 23, 1913. Serial No. 775,295.

*To all whom it may concern:*

Be it known that I, AMOS CALLESON, a citizen of the United States, residing at Brooklyn, in the county of Kings and State of New York, have invented certain new and useful Improvements in Filling and Capping Machines, of which the following is a specification.

This invention relates to machines for filling and sealing bottles or the like, and it consists in certain improvements hereinafter set forth in the clauses of the claim whereby the following principal objects are accomplished, to wit: To provide a machine whereby the filling and sealing of bottles may be accomplished with great expedition and substantially wholly without the aid of attendants except for introducing the empty bottles to and removing the filled bottles from the machine; whereby bottles may be operated upon which may vary more or less in size, especially in height; and whereby accuracy and efficiency of operation will be insured, for instance, so that uniform quantities of liquid will be delivered to the bottles, waste avoided, and delay or injury to the machine, due to careless handling, prevented.

Other objects will appear hereinafter in the following description, which, taken with the accompanying drawings, explains the preferred form of the improved machine.

In said drawings, Figure 1 is a side elevation of the machine, certain parts being omitted; Fig. 2 is a vertical sectional view of the lower part of the main frame and a rotary structure journaled therein and forming a frame in which certain of the mechanisms have movement; Fig. 3 is a horizontal sectional view in a plane just above the bottle-feeding table; Fig. 4 is a substantially similar view on a larger scale, with said table and certain other parts removed; Figs. 5 and 6 are fragmentary vertical sectional views on lines x—x and y—y, respectively, of Fig. 8, showing one of the bottle-elevating plungers; Figs. 7 and 8 are front elevations of the grip device of said plunger with and without its front plate, certain parts appearing in section; Fig. 9 is a front elevation of the cover plate of the grip device; Fig. 10 is a fragmentary side elevation of the plunger, the cams controlling the same appearing in section; Fig. 11 is a plan of a bottle-support; Fig. 12 is a horizontal sectional view in a plane just above the liquid reservoirs, certain parts being omitted; Fig. 13 is a plan, Figs. 14 and 15 end views and Fig. 16 a longitudinal sectional view of a certain block 2; Figs. 17, 18 and 19 are a side elevation, partly in section, a plan and an end elevation of a certain slide 9; Fig. 20 is a fragmentary plan of the uppermost disk of the aforesaid rotary structure partly broken away to reveal the bottle-neck gripping gaskets and their operating means; Fig. 21 is a vertical sectional view of one of said gaskets and a part of its operating means; Fig. 22 is a horizontal sectional view similar to Fig. 12 but including certain parts omitted therein; Fig. 23 is a plan of a system of slides, the race therefor, and their operating mechanism; Fig. 24 shows in fragmentary front elevation and also in vertical section said race and the syrup-filling and master slide groups; Figs. 25, 26 and 27 are a plan, front elevation and vertical sectional view of the main slide of the master group; Figs. 28 and 29 are a plan and front elevation of the auxiliary slide of the master group; Figs. 30, 31 and 32 show the syrup supply slide in side and end elevation and in plan; Fig. 33 is an inside elevation of the vertically moving syrup reservoir structure and Fig. 34 shows details of its valve; Figs. 35, 36 and 37 are a side and an end elevation and a plan of the sealing head slide; Fig. 38 is a fragmentary elevation of the vertically movable sealing-head structure; Figs. 39, 40 and 41 are top and bottom plans and a side elevation of the channeled bushing on which the liquid reservoir structure rotates; Fig. 42 is a vertical sectional view of the collar on which said bushing is fixed; Fig. 43 is a vertical sectional view of the body part of said structure and Fig. 44 is a plan thereof; Fig. 45 shows the cap supplying and controlling means and Fig. 46 shows the cap controlling means on a larger scale; Fig. 47 is a vertical sectional view on substantially the line z—z of Fig. 22, showing the liquid supply and liquid-flow-controlling means, the syrup supply means and the cap-apply means; Fig. 48 is a sectional view showing the cap-applying means and adjacent mechanism in the positions they occupy at the beginning of the cap-applying operation; and, Fig. 49 is a plan illustrating the camway 97.

The stationary frame includes the fixed central shaft $a$, the pillars $b$, the base $c$, ring $d$ having cam ring $d'$, the part-circular raceing $e$, Figs. 1 and 23, and the head $f$. The rotary frame includes the cylindrical pillar $g$ suitably journaled on the shaft $a$, and the lower disk $h$, intermediate disk or hood $i$, and upper disk $j$, all fixed on the pillar $g$.

All of the operations incident to the filling and sealing of the bottles are performed as the bottles are carried around the shaft $a$ in a circular course one after the other. They are started on this course by the means shown at the lower right in Fig. 3, and after undergoing the filling and sealing operations they are discharged onto the left hand end of a stationary table shown in said figure. The said means and the table will be later described.

While undergoing the filling and sealing operations each bottle rests upon one of a circular series of bottle supports $k$ each having an elastic bottle seat $l$ and an upstanding portion $m$ suitably recessed and padded so as to center the bottle on the seat $l$ when, as will appear, the bottle is slid onto said support. Each support $k$ forms the head of a carrier or plunger which is guided for vertical movement in the disks $h$ and $i$ and which, as the size of the bottle demands, is adjusted in effective height. Each plunger includes a stem $n$ carrying the support $k$ and suitably guided in the disks $i$ and $h$, and a grip device now to be described in detail.

$o$ is a block having a vertical groove $p$ receiving the stem $n$ and having a cover plate $q$ covering said groove and certain other parts to be described, and also having an inwardly projecting forked stud $r$ which receives a vertical fin $s$ on the pillar $g$ and so holds the plunger from turning while allowing vertical movement of the grip device. Fiber or other friction plates $t$, under the influence of springs $u$ housed in the block $o$, establish a slip-friction-grip of the grip device on the stem. As will apppear, upon the bottle coming to rest on the support $k$ the plunger is elevated and forces the head of the bottle against a gaging abutment, slippage then occurring as between the stem and the grip-device. When the upward pressure on the plunger ceases the slip-grip as between the stem and grip-device is converted into a positive grip by the clutch means shown in Figs. 5, 7, 8 and 10 as follows: Clutch-rolls $v$, pressed downwardly by spring plungers $w$ and housed in the block $o$, are adapted to become jammed between the side of the stem $n$ and the opposite walls $x$, converging downwardly toward the stem, of the recesses containing them and thus bind or lock the stem positively to the grip-device in a well-known manner. A lever $y$, however, fulcrumed in the block keeps the train of parts $v$, $w$ elevated until their positive locking action is to occur. The means for elevating the plunger and controlling its lever $y$ will be later described.

In radial grooves $z$ in the top of disk $j$ (Figs. 2 and 12) are set blocks 2 (Figs. 13-16) each having a longitudinal interior guideway 3, having a cushion 4 (Figs. 45-48) at the outer end thereof, and a longitudinal slot 5 and an orifice 6 penetrating it. The outer top portion of the block is cut away forming part of a beveled shoulder 7 (extending clear around the disk $j$) and, around the orifice, a bottle-cap rest 8. In the guideway is a slide 9 having upward and downward bosses 10 and 11 protruding from the block 2 through its slot. The boss 10 is fitted with a roller 12 and it and the slide have a port 13 which at one end terminates in a nipple 14 on the boss 10 and at the other opens downwardly at the outer end of the slide. This port may be closed by the downwardly protruding valve 13'. The block and slide have also the ports 15 which, when the slide is at its extreme outermost position register to form a vent. The slide forms a part of the means (as will appear) for conveying the liquid to the bottle; it also forms with the other slides means whereby all bottles passing through the machine may have their heads preliminarily established at the same level, thus: One such block and slide are arranged directly above each plunger (*supra*). A roller 16 on the grip-device of the plunger runs on a camway 17 having a low and a high level, $17^a$, $17^b$ joined by the rise $17^c$ terminating in a slight hump $17^d$ (Fig. 1) and by the fall $17^e$ having the incipient hump $17^f$. When the plunger mounts the rise $17^c$ it thrusts the head of the bottle carried thereby against the slide (at this time in its outermost position), slippage of the stem in the grip device of the plunger then occurring until the top of the rise is reached, whereupon the whole plunger falls back somewhat, as it passes from the hump $17^d$ to the level $17^b$, so that the bottle head is just out of contact with the slide. Thus each bottle has its head preliminarily established at a certain level. (All the operations incident to filling and sealing each bottle occur while the plunger is passing over the high level 17 and the hump $17^f$, as will appear). A cam way 18, extending parallel with the low level $17^a$ and rise $17^c$, supports the lever $y$ of the grip-device (thereby maintaining it clutch passive) until the roller 16 has reached the summit of the rise $17^c$, whereupon, terminating, it allows the lever to fall and the clutch to become active to positivel hold the stem at the exact relative elevation it has been made to assume.

A circular series of segmental orificed plates 19 is suitably secured to the under side of the disk $j$ each covering and forming a housing with a circular opening 20 which is open at the disk's periphery and opens upwardly into one of the grooves $z$ (Figs. 2, 20, 47 and 48). An elastic bottle-gripping gasket 21 is supported in this housing by the radially movable blocks 22 each having a dove-tail tongue and groove connection 23—Fig. 48—with the gasket and a radial tongue 24 sliding in a suitable groove in the plate 19, and the series of blocks may be contracted, to contract the gasket, by a rotary ring 25 having inward cam-projections 26 bearing against rollers 27 on the blocks and an outwardly projecting roller-carrying arm 28 held against the cam-ring $d'$ on the ring $d$ by a spring 29. The neck of each bottle, when elevated as above stated, is thrust through gasket 21, whereupon at the proper stage the gasket is contracted into gripping relation with the bottle due to the ring 25 being turned against the tension of its spring 29 by the cam-ring $d'$. By this operation the bottle becomes exactly centered on the support $k$ relatively to the filling and other subsequently acting appliances.

The race ring $e$ is suitably secured to the four pillars $b$ and on it are arranged to slide the master slide 30 and the syrup charging and sealing head slides 31 and 32, the three being connected by the adjustable links 33 so as to slide all together. Arranged to slide on the master slide is the auxiliary slide 34 and suitably guided in the slides 31 and 32 are the vertically moving slides 35 and 36. On a vertical stud 37 on the slide 31 is fulcrumed a bell crank lever 38 having one arm connected by the link 39 with the auxiliary slide 34 and the other arm connected by a flexible link 40 with one arm of a bell crank lever 41 whose other arm has a pivoted bearing piece 42 arranged to play back and forth in a horizontal slot 43 in the slide 35; the slide 36 is moved up and down by a cam lever 44 fulcrumed in the slide 32 and which, when turned to the left in Fig. 35, bears down upon a roller 45 on the slide, and, when turned to the right, wipes its stud 44ᵃ against an overhanging shoulder 46 on the slide, said lever being connected with slide 34 by the link 47. As the train of slides is moved back and forth on the race, the slide 34 is reciprocated on the master slide 30, the differential movement thus occurring being caused by two levers 48 and 49 fulcrumed on a suitable stationary shaft 50, having teeth to respectively intermesh with gear teeth on the auxiliary slide 34 and master slide 30 (Figs. 23 to 27) and oscillated back and forth by pairs of cams 51 and 52 each wiping against the inner sides of a pair of rollers 53 on each lever, the cams being carried by a suitably journaled shaft 54. Due to the differential movement, as the slides 31 and 32 reciprocate, the slides 35 and 36 move up and down.

Turning, now, to the syrup charging means, the liquid filling means, the closure affixing means and the closure supplying means, and first to the syrup charging means: The slide 35 (Figs. 32, 33, 34 and 47) carries a reservoir constructed as follows: 55 is a cylinder secured to the slide and having screwed into its lower end the threaded sleeve 56 through which extends the tubular stem of a plunger 57 having its head arranged in the cylinder, said plunger carrying at its lower end a nozzle 58 containing a spring 59 which presses a valve 60 upwardly against the lower end of the plunger and normally prevents the escape of the syrup contained in the cylinder. The cylinder may be supplied with syrup from any suitable source by a tubular connection 61 attached to a removable plug 62 forming the top of the cylinder. After the head of the bottle has been elevated and gaged at the proper level by the slide 9, then descends slightly, and then becomes gripped by the gasket 21, the slide 9 is retracted by means to be explained. As the bottle proceeds on its rotary course the syrup charging slide advances with it for a certain distance and at this time the auxiliary slide 34, moved faster than the train of slides 30, 31 and 32 through the connections 39, 38, 40 and 41, forces downwardly in the slide 31, the slide 35; the nozzle 58 is checked in its downward movement by the bottle into whose mouth its reduced lower end (Fig. 47) is thrust, and as the cylinder 55 continues the downward movement the resulting pressure upon the contained body of syrup forces open the valve 60 and allows the syrup to enter the bottle. When the slide 35 rises a fresh quantity of syrup enters the cylinder, restoring the plunger to its normal position. The amount of syrup in this way dispensed to each bottle may be varied by adjusting the capacity of the cylinder by screwing the sleeve 56 inwardly or outwardly in the cylinder to vary the distance between the head of the plunger and the plug 62. If there should be no bottle present the nozzle would be projected through the gasket without opposition and consequently no syrup would flow.

The filling means will now be described: On a collar 63 secured on the shaft $a$ above the disk $j$ is fixed the bushing 64 having on one side the filling-liquid-conducting and air-escape channels 64ᵃ and 64ᵇ, respectively, and on the other side the filling-liquid-conducting and gas-pressure channels 64ᶜ and 64ᵈ, respectively, each channel extending partially around the bushing as shown best in Fig. 39; the channels 64ᵃ and 64ᵈ have leading-in ports 64ᵃ′ and 64ᵈ′, formed with suitable nipples 65 and 66, respectively, and the channel 64ᵇ has an outlet port 64ᵇ′ leading to atmosphere. Between adjustable screw-rings 67 on this bushing is journaled the body part 68 of the liquid reservoir supporting structure, the same having upstanding from said body part the transparent glass cylinders 69 arranged in a circle and each surmounted by a head 70 into which is screwed a hollow threaded sleeve 71 through which extends the hollow stem of a piston 72 confined against vertical movement (though rotative) relative to the sleeve by its piston head and a nut 73; by turning the sleeve in the head 70 the piston is raised or lowered, changing the capacity of the reservoir formed by the cylinder and its adjuncts. The fittings 71ᵃ and 72ᵃ afford handles for effecting the relative rotation of parts 71 and 72. The piston has suitably attached thereto a float 74 which, when elevated by liquid in the reservoir, forces a valve 75 upwardly into closing relation to the port of the piston. For each reservoir said structure has a port 68ᵃ leading from its inner surface in the horizontal plane of channel 64ᵃ to the interior of the reservoir; a port 68ᵇ leading from said reservoir to the inner surface of said structure in the horizontal plane of the channel 64ᶜ; a port 68ᶜ connecting the inner surface of said structure in the horizontal plane of the channels 64ᵇ and 64ᵈ with a nipple 76 which is connected with the fitting 72ᵃ by the flexible tubing 78; and a port 68ᵈ (Figs. 44 and 47) leading from the inner surface of said structure in the horizontal plane of channel 64ᵉ to an exterior nipple 79 onto which the nipple 14 (Figs. 17, 19 and 47) is fitted a flexible tube 80. Flexible tubes 81 and 82, attached to the nipples 65 and 66, are respectively connected to suitable filling-liquid and gas-pressure sources (not shown). The reservoir structure is coupled with the disk j so as to rotate therewith by one or more posts 83 (Figs. 12 and 47) fixed in each of them. While each reservoir is passing through approximately one-half of the cycle the filling liquid enters the reservoir via 81, 64ᵃ′, 64ᵃ, and 68ᵃ, the air in the reservoir escaping via 72, 78, 68ᶜ, 64ᵇ, and 64ᵇ′; the liquid flow stops when the valve 75 is raised to its seat by the rising liquid. When the reservoir is passing through approximately the other half of the cycle the liquid charge in the reservoir escapes via 68ᵇ, 64ᶜ, 80, and port 13 of the slide 9 to the bottle under gas pressure admitted to the reservoir via 82, 64ᵈ′, 64ᵈ, 68ᶜ, 78 and 72. A valve is thus produced by the parts 64 and 68. The manner of preserving a sealed-chamber condition around the bottle mouth during filling and of venting the air in the bottle at that time will be explained later. A yielding thrust-piece 84, carried by each bottle support k, is adapted, should no bottle be present on the support, to elevate the valve 13′ and so cut off the discharge of the liquid through port 13 of slide 9 and prevent waste in that case.

The closure-affixing and closure-supplying means will now be described.

The slide 36 forms a vertical hollow stem into the lower end of which is screwed the thimble 85 guiding and forming a seat for the plunger 86 pressed downwardly thereagainst by a spring 87 bearing upwardly against a plug 88 screwed into the stem. The lower end of the plunger normally protrudes into a sealing device 89 (cylindrical in form so that when a closure surmounting a bottle head is forced up into the same its flange will be contracted into locking engagement with the shoulder on the bottle in a well known manner) held between the thimble 85 and the interior flange of a cap 89ᵃ having its lower face stepped (Figs. 36 and 47) and provided with a stepped elastic gasket 89ᵇ to conform with the top surface of each block 2 as at 7 thereof.

The closures (ordinary crowns or the like) are supplied from a suitable hopper 90 Figs. 1 and 45 to its chute 91 whose lower end is deflected toward and terminates close to the shoulder 7 on the disk j; the hopper is provided with any suitable means for discharging the closures in properly faced disposition, the same in the present instance having the rack 92 for operating its moving parts. As the disk j rotates, the lowermost closure in the chute wipes against the shoulder 7 until it reaches an approaching recess forming the rest 8 when, if otherwise free to do so, it is forced by those behind onto said rest, clear of the chute. The closures are thus one after the other transferred from the chute to the disk k, each assuming a position on the disk directly above the mouth of the bottle, if present. If no bottle is present it is desirable that no cap or closure should be fed to the corresponding rest 8, since otherwise the cap, remaining on its seat until the syrup charging means is reached, would cause the latter to waste a charge of syrup and foul the parts. A detector lever 93 (Fig. 46) is therefore pivoted in the ring d adjacent to the chute 91 and is held projecting into the path of the upward rise of the bottle by a spring 94 connecting a rod 95, pivoted to said lever, with the chute. A detent lever 96, fulcrumed in the chute and pivotally connected to the rod, is normally held by the latter in obstructing relation to a train of closures in the chute; but if a bottle is present and, in passing, shifts the lever 93, the detent lever releases the train of closures so that the lowest closure will be free to seat itself on the disk $j$ as soon as the next rest 8 approaches.

Each slide 9 in one complete cycle of the disk $j$ performs two inward and outward radial movements; it moves to the outward position, first, so as to be in position (as described), to serve as a gage in coöperating with the compensating bottle elevating means; it then returns to the inward position so that the opening 6 through the block 2 is unobstructed for the descent of the nozzle of the syrup charging means, it then moves to the outward position again so as to bring the discharge end of its port 13 over the mouth of the bottle, i. e., the position it occupies when the filling-liquid is fed to the bottle; it finally returns to its inward position so as again to leave unobstructed the opening 6 through the block 2 for the rise of the bottle neck incident to the closure affixing operation. For producing these movements of each slide 9 a suitable camway 97, receiving the roller 12 on the slide, is formed between the sinuous periphery of a disk 98, secured on shaft $a$ between the parts $j$ and 63, and two diametrically opposite yokes 99 (Figs. 12, 45, 47 and 48) secured on the ring $d$ and overhanging disk $j$.

The means shown at the lower right of Fig. 3, and also in Fig. 1, for delivering the bottles one after the other onto the bottle supports $k$ includes a thin disk 100 arranged above the table 101 so as just to overlap each bottle support as it passes. The attendant places the bottles on the disk 100 and they are thereby carried through a curved guideway formed by the fixed walls 102 toward the series of rotating bottle supports. By a mechanism 103, which forms no part of the present invention, the bottles are then successively wiped off the disk 100 onto their respective supports. The disk 100 and a friction disk 104 are fixed on a vertical shaft 105, and as the disk 104 is in peripheral contact with the periphery 106 of the rotating disk $i$, the disk 100 is kept continuously rotating. After each bottle has been filled and sealed, its support having now been depressed to its lowest position, the bottle is wiped off the support onto the table 101 by the deflector 107.

In the head $f$ is journaled the drive shaft 108 which, through a worm 109 thereon and worm-wheel 110 on the shaft 54, rotates the latter and through the same, by a pinion 111 on said shaft 54, an intermediate pinion 112 and a gear 113 formed on the disk $j$, rotates said disk $j$. The rack 92 of the closure discharging means for the hopper is pivoted to a crank 114 on a shaft 115 suitably journaled in the head $f$ (Fig. 45), said shaft being driven from the disk $j$ through a transmission shaft 116 suitably geared with the shaft 115 and said disk (Figs. 1, 22 and 45).

Operation: Upon each bottle being transferred from the receiving disk 100 to a bottle support $k$, it is first elevated by its telescoping plunger as the same mounts the rise $17^c$, its mouth, whatever the height of the bottle, being in that way brought against the corresponding slide 9 (which at this time has been forced by the camway 97 to its outward position) and thereby initially established at a definite level. After the plunger, having passed over the hump $17^d$, descends to the level $17^b$, allowing the bottle mouth to move out of contact with the slide 9 the camway 97 begins to retract the slide. (In the present instance, twelve bottles at a time are proceeding in a circular course around the shaft $a$. Therefore, for each cycle of movement of the means for conveying the bottles in said course the system of slides 30, 31 and 32 and their adjuncts make twelve complete reciprocating movements, the parts being so timed in their action that each movement of said system in one direction is in the same direction and at the same speed as the bottles, whose movement is a continuous or uninterrupted one). The mouth of the bottle, now projecting into its gasket 21 (right hand, Fig. 47), is gripped thereby due to the ring 25 being turned by the camway on the inside of the ring $d'$ and contracting said gasket in the way already described, whereupon, the syrup charging slide 35 is depressed in the way explained, the nozzle 58 being thrust into and against the mouth of the bottle and thus causing the charge of syrup in the cylinder 55 to be ejected into the bottle, as stated. It will be understood that in the now ensuing movement of the system of slides 30, 31 and 32 reversely to the bottles the cylinder 55 is recharged. The camway 97 now returns the slide 9 to its outward position, bringing the discharge end of the port 13 therein directly over the mouth of the bottle (left hand, Fig. 47). Meanwhile the filling-liquid cylinder 69 corresponding to the bottle being referred to is receiving its charge of filling-liquid in the way already explained. Upon the eduction port $68^b$ of said cylinder reaching the channel $64^c$ the filling-liquid charge in said cylinder begins to flow through the tube 80 and the port 13 in the slide 9 into the bottle, assisted by the gas pressure, as explained, admitted above the charge in said cylinder through the tubes 82 and 78, the air in the bottle escaping via the vent formed by the now registering ports 15 of slide 9 and block 2. When the whole liquid charge has been transferred from the cylinder 69 to the bottle the hollow stem of slide 36 (now directly over and advancing with the bottle) is depressed, sealing the vent (Fig. 48) and forming a sealed chamber with parts 86, 85, 89ᵃ, 2, 9, 23 and the bottle; in this chamber the gas, following up the liquid, is confined until the bottle is ultimately sealed, so that a "head" or pressure is maintained on the liquid until that time. The camway 97 now retracts the slide 9, leaving said chamber still formed and hermetically sealed, whereupon the telescoping plunger rises upon the hump 17ᵗ, which action forces the bottle mouth first against the closure and then upwardly into the sealing device 89, which contracts the closure into locking engagement with the shoulder on the bottle mouth. Following this, the cam ring d' releases the ring 25 which has been maintaining the gasket 21 contracted, allowing the gasket to expand and release the bottle, whereupon, the bottle supporting plunger passes down the fall 17ˢ, allowing the plunger 86 to eject the bottle from the sealing device and the bottle to assume its initial level, ready to be wiped off of its support h upon contact with the deflector 107. At a suitable time before the plunger reaches its lowest limit of movement its lever y begins to ride upon the camway 18 so that the positive lock between the grip device and the stem of the plunger afforded by the rolls v is destroyed and as the plunger continues to descend a stop 117 on said stem strikes the disk h, stopping the descent of the stem while the grip device continues to descend until it assumes the initial relation to said stem.

It will be understood that the chute 91 discharges the caps or closures one after the other to their seats 8 on the disk j at a point relatively in advance of the point where the slide 36 descends and forms the aforesaid chamber (see Fig. 22).

It will be noted that upon retraction of the slide 9 the vent is cut off by the ports 15 failing to continue in registry before the slide 9 has retracted sufficiently to cut off the flow of the fluid to the bottle, so that regardless of the efficiency of the gasket 89ᵇ to close the air escape vent said vent is in this way effectually closed sufficiently before the inflow of the fluid ceases to allow the desired "head" or pressure to accumulate.

In the way fully explained, unpremeditated conditions that might foul the machine with syrup or filling-liquid or otherwise interfere with its proper action are avoided by making the syrup charging, liquid-filling and cap-dispensing operations respectively dependent on the actual presence of a bottle at the several points where these operations occur.

Having thus fully described my invention what I claim as new and desire to secure by Letters Patent is:

1. In combination, a vertically yielding container-carrier member, a gaging container-abutment member, a supporting frame for said members, said abutment member having a definite gaging position in said frame in vertical alinement with the carrier member and being movable into and out of said position, and means to move one of said members toward the other when the abutment member is in said position.

2. In combination, a vertically yielding container-carrier member, a gaging container-abutment member, a supporting frame for said members, said abutment member being movable in the frame into and out of vertical opposition to the carrier member, and means to move one of said members toward the other when vertically opposed to each other.

3. In combination, a vertically yielding container-carrier member, a traveling supporting structure for said member, a gaging abutment member traveling with said structure and vertically alined with said carrier member, and means, with reference to which said structure travels, for moving one of said members toward the other while traveling with said structure.

4. In combination, a vertically yielding container-carrier member, a gaging container-abutment member, a traveling frame supporting said members, one of said members having vertical movement and the abutment member having movement into and out of vertical opposition to the carrier member, and means, with reference to which said members travel with said frame, for effecting said movement.

5. In combination with a supporting structure, means to operate on a container and a yielding container carrier member having thrust-movement one toward the other in said structure, a gaging container-abutment member arranged over the supported container, means to move one of said members toward the other, and means for thereupon retracting the abutment member from above the container.

6. In combination, a container-carrier member comprising two parts, one vertically yielding in the other, a gaging container-abutment member vertically opposed to the carrier member, a traveling frame supporting said members, means to effect movement of one of said members vertically toward the other, and means, with reference to which said carrier member travels with said frame, for moving back said yielding part in said other part after yielding.

7. In combination, a container-carrier member comprising two parts, one vertically yielding in the other, means in one of said parts, normally acting to interlock them, a traveling frame supporting said member, and means, with reference to which said member travels with the frame, for controlling the first-named means.

8. In combination, a container-carrier member comprising two parts, one vertically yielding in the other, means in one of said parts normally acting to interlock them, a traveling frame supporting said member, and means, with reference to which said member travels with the frame, for causing said first-named means to release said parts.

9. A bottle support including a lower member, an upper member, said members having a vertical sliding connection with each other, a clutch device normally locking said members together, and means to release the clutch device.

10. In combination with a supporting structure, a traveling frame arranged therein, means, opposing alternately decreased and increased resistance to thrustwise pressure of the container, for supporting the container, and a gaging container-abutment and a means to operate on the container respectively opposed to the container-side of said support during the periods of decreased and increased resistance to the movement of said support, said abutment being carried by said frame.

11. In combination, a supporting structure, a traveling frame arranged therein, a vertically yielding container-carrier member movable with the frame, a container-abutment and means to operate on the container arranged relatively opposite the container side of the carrier member and respectively carried by said frame and structure, and means to vertically move the carrier member while traveling with the frame.

12. In combination, a supporting structure, a laterally traveling frame movable therein, a plurality of yielding container carriers arranged side by side and movable with said frame, means to elevate said carriers successively in the travel of the frame, means for moving a gaging abutment into and out of the path of upward movement of each container, and means for thereupon operating on said container.

13. In combination, a fixed frame structure, a laterally moving frame arranged therein, a vertically moving and vertically yielding container-carrier member guided by the moving frame, a gaging abutment in the frame to receive the vertical thrust of the container, and means to move the carrier member vertically while traveling with the frame.

14. In combination, a supporting structure, a rotary frame journaled therein on a vertical axis, a plurality of yielding container carriers arranged in different radii from said axis and movable with said frame, means to elevate said carriers successively in the travel of the frame, a plurality of gaging abutments for the containers each movable in the frame into and out of engagement with a container, means for moving the gaging abutments and means for operating on the containers.

15. In combination, a fixed frame structure, a laterally moving frame arranged therein, a vertically moving and vertically yielding container carrier guided by the moving frame, gaging means in the moving frame receiving the vertical thrust of the containers, and a cam-way having rises and falls over which the container carrier travels in the movement of the moving frame.

16. In combination, a fixed frame structure, a laterally moving frame arranged therein, a plurality of individually vertically moving container carriers guided by the moving frame, means carried by the fixed frame structure above the carriers for operating on the mouths of the containers, means for moving the moving frame continuously, and means for elevating said carriers in turn while advancing with said frame.

17. In combination with a supporting structure, a frame arranged to move laterally therein, means to advance the frame always in one direction, a plurality of container carriers movable vertically in the frame and arranged one in advance of the other, means to operate on the containers arranged in said structure above the carriers and movable back and forth, in one direction with the frame, and means to successively elevate the carriers.

18. In combination, a suitable support, means laterally movable therein for supporting a laterally extending row of containers, a plurality of means arranged the one laterally in advance of the other for operating on the containers, and means for reciprocating said last-named means laterally as a unit.

19. In combination, a suitable support, means journaled therein on a vertical axis for supporting a laterally extending row of containers, a plurality of means arranged one laterally in advance of the other for operating on the containers, means to rotate the first means always in one direction and means to reciprocate the second-named means laterally back and forth as a unit.

20. In combination, a suitable support, a laterally movable carrying means arranged therein, a plurality of instrumentalities for operating on the containers arranged one laterally in advance of the other in said means, and means for presenting each container first to one and then to the other of said instrumentalities.

21. In combination, a suitable support, a laterally movable carrying means arranged therein, a plurality of instrumentalities for operating on the containers arranged one laterally in advance of the other in said means, mechanism for reciprocating said means laterally back and forth, and means for advancing each container laterally and meanwhile presenting the same first to one and then to the other of said instrumentalities.

22. In combination, a suitable support, a laterally movable carrying means arranged therein, a plurality of instrumentalities for operating on the containers arranged one laterally in advance of the other in said means, mechanism for reciprocating said means laterally back and forth, mechanism for moving said instrumentalities in said means, and means for sustaining the containers in operative relation to said instrumentalities while being operated upon thereby.

23. In combination, a suitable support, a carrying means movable around a vertical axis in the support, a plurality of instrumentalities for operating on the containers arranged one laterally in advance of the other in said means, mechanism for reciprocating said means laterally back and forth, mechanism for moving said instrumentalities in said means, and means for advancing the containers around said axis in one direction and in operative relation to said instrumentalities.

24. In combination, with a supporting structure, means for advancing laterally therein a plurality of containers, means carried by the first means, for forming a series of sealed chambers one around the mouth of each container while advancing, and means relatively to which the containers and the second means are advanced for introducing to the containers the filling material in succession through said chambers.

25. In combination, a structure having a succession of container-mouth-receiving openings, and means to form a sealed chamber at each opening including an opening-closing appliance, said structure and said appliance having movement one past the other to bring the appliance into closing relation to said openings, successively.

26. In combination, a structure having a succession of container-mouth-receiving openings, and means to form a sealed chamber at each opening including an opening-closing sealing appliance, said structure and said appliance having movement one past the other to bring the appliance into closing relation to said openings, successively.

27. In combination, means to receive and form a sealed chamber around a container-mouth, said means having a filling inlet to said chamber and a part of its chamber-forming portion movable to form a container-mouth exposing opening, and means, including an appliance for operating on the container, for hermetically covering said opening prior to the moving of said part.

28. In combination, means to receive and form a sealed chamber around a container-mouth, said means having a part of its chamber-forming portion movable to form a container-mouth exposing opening and including an inlet to said chamber, and means, including an appliance for operating on the container, for hermetically covering said opening prior to the moving of said part.

29. In combination, means to receive and form a sealed chamber around a container-mouth, said means having a part of its chamber-forming portion movable to form a container-mouth exposing opening and constituting a controlling device for a fluid to be introduced into said chamber, and means, including an appliance for operating on the container, for hermetically covering said opening prior to the moving of said part.

30. In combination, means to receive and form a sealed chamber around a container-mouth, said means having a filling inlet to and air escape vent from said chamber and a part of its chamber-forming portion movable to form a container-mouth exposing opening, and means, including an appliance for operating on the container, for hermetically covering said opening prior to the moving of said part and closing said vent.

31. In combination, means to receive and form a sealed chamber around a container-mouth, said means having a filling inlet to and an air escape vent from said chamber and a part of its chamber-forming portion movable to form a container-mouth exposing opening and to close the vent, and means, including an appliance for operating on the container, for hermetically covering said opening prior to the moving of said part.

32. In combination, means to receive and form a sealed chamber around a container-mouth, said means having a part of its chamber-forming portion constituting a fluid-admission controller and movable to form a container-mouth exposing opening, and means, including an appliance for operating on the container, for hermetically covering said opening prior to the moving of said part.

33. In combination, means to receive and form a sealed chamber around a container-mouth, said means having a part of its chamber-forming portion constituting a container-gaging abutment and movable to form a container-mouth-exposing opening, and means, including an appliance for operating on the container, for hermetically covering said opening prior to the moving of said part.

34. In combination, a receiver for the filling charge and a valve permitting a flow of filling liquid to and of contained air from said receiver during a portion of the range of movement of the moving member of the valve and permitting a flow of liquid ejecting fluid pressure to and of filling liquid from said receiver during another portion of the range of movement of said member.

35. In combination, a receiver for the filling charge and a valve permitting a flow of filling liquid to and of contained air from said receiver during a portion of the range of movement of the moving member of the valve and permitting a flow of liquid ejecting fluid pressure to and of filling liquid from said receiver during another portion of the range of movement of said member, and means coupling the receiver to said member for movement therewith.

36. In combination, an axial supporting member, a rotary member journaled thereon, and a receiver coupled to rotate with said rotary member, said members forming a valve permitting a flow of filling liquid to and of contained air from said receiver during a portion of the range of movement of the rotary member of the valve and permitting a flow of liquid ejecting fluid pressure to and of filling liquid from said receiver during another portion of the range of movement of said rotary member.

37. In combination, a supporting means for the container and a supporting-means-controlled means for conducting the fluid to the container, one of said means being movable into fluid-flow-controlling engagement with the other and said conducting means affording a container-abutment and thereby limiting said relative movement when a container is present on the support.

38. In combination, a supporting means for the container and a conducting means for the fluid having a supporting-means-closed normally open valve, one of said means being movable toward the other and said supporting means and the valve being thereupon engageable with each other and said conducting means affording a container abutment and thereby limiting said relative movement when a container is present on the support.

39. In combination, two structures movable one laterally with reference to the other, a contractible container-gripping means and a rotary contracting device for the gripping means carried by one of said structures, said device being engageable with and rotated by the other of said structures.

40. In combination, means to receive a container-mouth having a part thereof constituting a container-gaging abutment, means to effect relative movement as between the first means and the container, the one toward the other, to bring the container and abutment together, means for thereupon withdrawing said abutment from the container, and means for thereupon operating on the container-mouth.

41. Means to form a closed chamber about a bottle mouth having a filling passage leading to the chamber and including a valve-forming movable container abutment containing a portion of said passage.

42. Means to form a closed chamber about a bottle mouth having a venting passage leading to the chamber and including a valve-forming movable container abutment containing a portion of said passage.

43. In combination, an apertured structure for receiving the container-mouth, a container abutment movable in said structure into and out of obstructing relation to the aperture thereof, means to force a container-mouth against said abutment from one side of said structure and means for operating on the container at said aperture, the latter means being located at the other side of said structure.

44. In combination, a container-carrier member comprising two parts, one vertically yielding in the other, a releasable interlocking means for said member, said means being normally active to assume one of the interlocking and releasing conditions thereof, and means, with reference to which said member travels with the frame, for controlling the first-named means.

In testimony whereof I affix my signature in presence of two witnesses.

AMOS CALLESON.

Witnesses:
JAMES VAN WICKLEN,
FRANCIS H. MOSES.

Copies of this patent may be obtained for five cents each, by addressing the "Commissioner of Patents, Washington, D. C."